United States Patent
Hyun et al.

(10) Patent No.: US 10,240,036 B2
(45) Date of Patent: Mar. 26, 2019

(54) POLYMER COMPOSITION, MOLDED ARTICLE, AND METHOD OF MANUFACTURING THE MOLDED ARTICLE

(71) Applicant: SAMSUNG ELECTRONICS CO., LTD., Suwon-si, Gyeonggi-do (KR)

(72) Inventors: Song Won Hyun, Yongin (KR); In Kim, Suwon (KR); Kyeong Pang, Suwon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 154 days.

(21) Appl. No.: 14/883,739

(22) Filed: Oct. 15, 2015

(65) Prior Publication Data
US 2016/0319125 A1 Nov. 3, 2016

Related U.S. Application Data

(60) Provisional application No. 62/154,830, filed on Apr. 30, 2015.

(30) Foreign Application Priority Data

Jun. 10, 2015 (KR) .................. 10-2015-0081688

(51) Int. Cl.
*C08L 69/00* (2006.01)
*H01M 2/10* (2006.01)
(Continued)

(52) U.S. Cl.
CPC .............. *C08L 69/00* (2013.01); *B29B 7/007* (2013.01); *B29B 7/42* (2013.01); *B29B 7/484* (2013.01);
(Continued)

(58) Field of Classification Search
CPC . C08L 69/00; H01M 2/1066; H01M 2220/30; B29B 7/007; B29B 7/42;
(Continued)

(56) References Cited

U.S. PATENT DOCUMENTS

2005/0101757 A1 5/2005 Glasgow et al.
2007/0054982 A1 3/2007 Banerjie et al.
(Continued)

FOREIGN PATENT DOCUMENTS

JP 11172093 A * 6/1999 .............. C08L 69/00
JP 2005-40278 2/2005
(Continued)

OTHER PUBLICATIONS

Yamada et al., JP 11-172093 A machine translation in English, Jun. 29, 1999 (Year: 1999).*

(Continued)

*Primary Examiner* — David T Karst

(74) *Attorney, Agent, or Firm* — Staas & Halsey LLP

(57) ABSTRACT

An eco-friendly fire-retardant polymer composition, a molded article made from the composition, and a method of manufacturing the molded article. The composition includes: a thermoplastic resin containing polycarbonate; a bio-based resin containing polytrimethylene terephthalate extracted from a biomaterial; and an impact modifier containing a core-shell type elastomer.

25 Claims, 6 Drawing Sheets

(51) Int. Cl.

| | | |
|---|---|---|
| *B29B 7/00* | (2006.01) | |
| *B29B 7/42* | (2006.01) | |
| *B29B 7/48* | (2006.01) | |
| *B29C 47/00* | (2006.01) | |
| *B29C 47/08* | (2006.01) | |
| *B29C 47/30* | (2006.01) | |
| *B29C 47/80* | (2006.01) | |
| *B29B 9/06* | (2006.01) | |
| *C08L 51/08* | (2006.01) | |
| *C08L 67/02* | (2006.01) | |
| *C08L 83/10* | (2006.01) | |
| *B29K 69/00* | (2006.01) | |
| *B29K 105/06* | (2006.01) | |
| *B29K 309/08* | (2006.01) | |
| *B29L 31/00* | (2006.01) | |

(52) U.S. Cl.
CPC ...... *B29C 47/0011* (2013.01); *B29C 47/0801* (2013.01); *B29C 47/30* (2013.01); *B29C 47/807* (2013.01); *H01M 2/1066* (2013.01); *B29B 9/06* (2013.01); *B29K 2069/00* (2013.01); *B29K 2105/06* (2013.01); *B29K 2309/08* (2013.01); *B29K 2995/0016* (2013.01); *B29K 2995/0089* (2013.01); *B29L 2031/7146* (2013.01); *H01M 2220/30* (2013.01)

(58) Field of Classification Search
CPC ....... B29B 7/484; B29B 9/06; B29C 47/0011; B29C 47/0801; B29C 47/30; B29C 47/807; B29K 2069/00; B29K 2105/06; B29K 2309/08; B29K 2995/0089; B29K 2995/0016; B29L 2031/7146
USPC ........................................................ 523/134
See application file for complete search history.

(56) References Cited

U.S. PATENT DOCUMENTS

| | | |
|---|---|---|
| 2007/0142571 A1 | 6/2007 | Maekawa |
| 2007/0225473 A1 | 9/2007 | Determan et al. |
| 2007/0276069 A1 | 11/2007 | Agarwal et al. |
| 2008/0090961 A1* | 4/2008 | Li .......................... C08L 69/005 525/63 |
| 2008/0132641 A1 | 6/2008 | Li et al. |
| 2010/0069543 A1* | 3/2010 | Monden .................. C08K 5/42 524/161 |
| 2011/0207859 A1* | 8/2011 | Hasty ..................... C08G 63/16 524/47 |
| 2012/0129989 A1 | 5/2012 | Kim et al. |
| 2013/0270591 A1* | 10/2013 | de Brouwer .......... H01L 23/293 257/98 |
| 2014/0031456 A1* | 1/2014 | Alidedeoglu .......... C08K 5/103 523/507 |
| 2014/0147651 A1* | 5/2014 | Hitomi ................... C08G 64/06 428/220 |
| 2014/0353544 A1* | 12/2014 | Guo ........................ C09K 5/14 252/75 |

FOREIGN PATENT DOCUMENTS

| | | | |
|---|---|---|---|
| JP | 2013-56971 | 3/2013 | |
| KR | 10-2011-0006103 | 1/2011 | |
| WO | WO 01/11070 A2 | 2/2001 | |
| WO | WO 2012031054 A1 * | 3/2012 | ............. C08K 5/053 |

OTHER PUBLICATIONS

Espacenet Abstract, Japanese Publication No. 2013-56971, published Mar. 28, 2013.
International Search Report dated Feb. 3, 2016 in corresponding International Patent Application No. PCT/KR2015/011143.
Espacenet Abstract, Publication No. 2005-040278, Published Feb. 17, 2005.
KIPRIS Abstract, Publication No. 10-2011-0006103, Published Jan. 20, 2011.
Extended European Search Report dated Mar. 13, 2018 in corresponding European Patent Application No. 15890843.4.
European Office Action dated Oct. 4, 2018 in corresponding European Patent Application No. 15890843.4.
Currie, L.A. et al., " Authentication and dating of biomass components of industrial materials; links to sustainable technology", Nuclear Instruments and Methods in Physics Research B, vol. 172, Oct. 2000, pp. 281-287.

* cited by examiner

POLYMER COMPOSITION, MOLDED ARTICLE, AND METHOD OF MANUFACTURING THE MOLDED ARTICLE

CROSS-REFERENCE TO RELATED APPLICATIONS

This application claims the benefit of U.S. Patent Application Ser. No. 62/154,830, filed on Apr. 30, 2015 in the U.S. Patent and Trademark Office, and Korean Patent Application No. 10-2015-0081688, filed on Jun. 10, 2015 in the Korean Intellectual Property Office, the disclosures of which are incorporated herein by reference.

BACKGROUND

1. Field

Embodiments of the present disclosure relate to a polymer composition, a molded article, and a method of manufacturing the molded article, and more particularly, to an eco-friendly fire-retardant polymer composition, a molded article, and a method of manufacturing the molded article.

2. Description of the Related Art

With development of the electronic communication industry, various kinds of imaging devices and portable wireless terminals have compactness, slim shape, and high-definition, and their functions are also diversified.

Accordingly, a requirement for a material design maintaining the stiffness of a product despite its slim size, having rheological properties while maintaining moldability, and having eco-friendliness for meeting a consumer's needs is increasing.

Typically, in order to achieve these purposes, recycled materials, such as Post-Consumer Materials (PCM) or Post-Consumer Resin (PCR), or biomaterials were used. However, the recycled materials have problems of supply and demand instability and degradation of properties in view of impact strength, and the biomaterials have a problem of change in property of an injection-molded product due to crystallization.

For these problems, recently, various studies into materials capable of ensuring high stiffness and high flowability while having eco-friendliness for meeting a green consumer's needs are underway.

SUMMARY

Therefore, it is an aspect of the present disclosure to provide a polymer composition including bio-based polytrimethylene terephthalate (bio-PTT) which is an eco-friendly material, a molded article, and a method of manufacturing the molded article.

Also, it is another aspect of the present disclosure to provide a polymer resin further including a thermoplastic resin containing polycarbonate and a core-shell type elastomer in order to improve the properties of an eco-friendly material, a molded article, and a method of manufacturing the molded article.

Also, it is another aspect of the present disclosure to provide a polymer resin further including a glass fiber in order to improve the properties of an eco-friendly material, a molded article, and a method of manufacturing the molded article.

Additional aspects of the disclosure will be set forth in part in the description which follows and, in part, will be obvious from the description, or may be learned by practice of the disclosure.

In accordance with one aspect of the present disclosure, a polymer composition includes: a thermoplastic resin containing polycarbonate; a bio-based resin containing polytrimethylene terephthalate extracted from a biomaterial; and an impact modifier containing a core-shell type elastomer.

The polytrimethylene terephthalate may be extracted from a vegetable material.

The core of the core-shell type elastomer may include a silicon and acrylic copolymer, and the shell of the core-shell type elastomer may include polymethylmethacrylate (PMMA).

The polymer composition may include: 70 to 90 parts of weight (wt %) of the thermoplastic resin with respect to a weight of the polymer composition; 3 to 15 wt % of the bio-based resin containing the polytrimethylene terephthalate with respect to the weight of the polymer composition; and 3 to 10 wt % of the impact modifier containing the core-shell type elastomer with respect to the weight of the polymer composition.

The thermoplastic resin may include at least one resin selected from a group including a polycarbonate resin of a low molecular weight, a polycarbonate resin of a high molecular weight, or a polysiloxane-polycarbonate resin.

The thermoplastic resin may include: 40 to 60 wt % of the polycarbonate resin of the low molecular weight with respect to the weight of the polymer composition; 20 to 30 wt % of the polycarbonate resin of the high molecular weight with respect to the weight of the polymer composition; and 5 to 20 wt % of the polysiloxane-polycarbonate resin with respect to the weight of the polymer composition.

The polycarbonate resin of the low molecular weight may include a resin having a Melt Index (MI) exceeding 10 g/10 min at 300° C. and 1.2 kg, and the polycarbonate resin of the high molecular weight may include a resin having a MI of 10 g/10 min or less at 300° C. and 1.2 kg.

The polysiloxane-polycarbonate resin may include a siloxane block.

The core of the core-shell type elastomer may include a silicon and acrylic copolymer, and the shell of the core-shell type elastomer may include polymethylmethacrylate (PMMA).

The polymer composition may have V2 grade or more defined in the Underwriter's Laboratory (UL) standard.

The polymer composition may have a Melt Index (MI) of 10 g/10 min or more at 300° C. and 1.2 kg.

The polymer composition may have an Izod Notched Impact Strength of 70 kgfcm/cm or more.

In accordance with another aspect of the present disclosure, a polymer composition includes: a thermoplastic resin containing polycarbonate; a bio-based resin extracted from a biomaterial; an impact modifier containing core-shell type elastomer; and a stiffener containing a glass fiber.

The glass fiber may have a length of 3 to 4 mm and a diameter of 5 to 30 microns.

A section of the glass fiber may have an aspect ratio of 1:1 to 1:4.

The polymer composition may include: 55 to 80 parts of weight (wt %) of the thermoplastic resin with respect to a weight of the polymer composition; 3 to 15 wt % of the bio-based resin with respect to the weight of the polymer composition; 3 to 10 wt % of the impact modifier containing the core-shell type elastomer with respect to the weight of the polymer composition; and 10 to 30 wt % of the stiffener containing the glass fiber with respect to the weight of the polymer composition.

The thermoplastic resin may include at least one resin selected from a group including a polycarbonate resin of a low molecular weight, a polycarbonate resin of a high molecular weight, or a polysiloxane-polycarbonate resin.

The thermoplastic resin may include: 40 to 60 wt % of the polycarbonate resin of the low molecular weight with respect to the weight of the polymer composition; 20 to 30 wt % of the polycarbonate resin of the high molecular weight with respect to the weight of the polymer composition; and 5 to 20 wt % of the polysiloxane-polycarbonate resin with respect to the weight of the polymer composition.

The polycarbonate resin of the low molecular weight may include a resin having a Melt Index (MI) exceeding 10 g/10 min at 300° C. and 1.2 kg, and the polycarbonate resin of the high molecular weight may include a resin having a MI of 10 g/10 min or less at 300° C. and 1.2 kg.

The polymer composition may further include a surface modifier containing a siloxane copolyester.

The polymer composition may include: 55 to 80 wt % of the thermoplastic resin with respect to a weight of the polymer composition; 3 to 15 wt % of the bio-based resin with respect to the weight of the polymer composition; 3 to 10 wt % of the core-shell type elastomer with respect to the weight of the polymer composition; 10 to 30 wt % of the glass fiber with respect to the weight of the polymer composition; and 1 to 5 wt % of the surface modifier with respect to the weight of the polymer composition.

The siloxane copolyester may be an ABA block copolymer of a polyester block and a polysiloxane block.

The bio-based resin may include polytrimethylene terephthalate produced with a biomaterial extracted from a vegetable material including corn.

The polytrimethylene terephthalate may include radiocarbon C14.

The polymer composition may have V2 grade or more defined in the Underwriter's Laboratory (UL) standard.

The polymer composition may have a Melt Index (MI) of 10 g/10 min or more at 300° C. and 1.2 kg.

The polymer composition may have an Izod Notched Impact Strength of 70 kgfcm/cm or more.

In accordance with another aspect of the present disclosure, a method of manufacturing a molded article includes: at an extruder, producing a polymer composition including a thermoplastic resin containing polycarbonate, a bio-based resin containing polytrimethylene terephthalate extracted from a biomaterial, and an impact modifier containing a core-shell type elastomer; and putting the polymer composition into an injection-molding machine to injection-mold the polymer composition.

The producing of the polymer composition may include extruding the polymer composition.

The extruding of the polymer composition may include: melting the polymer composition; and applying shear stress to the polymer composition to disperse the polymer composition.

The producing of the polymer composition may include: supplying a surface modifier containing siloxane copolyester through a first side feeder to extrude the polymer composition; and supplying a stiffener containing a glass fiber through a second side feeder to extrude the polymer composition.

In accordance with another aspect of the present disclosure, there is provided a molded article manufactured with a polymer composition, the polymer composition including a thermoplastic resin containing polycarbonate, a bio-based resin containing polytrimethylene terephthalate extracted from a biomaterial, and an impact modifier containing a core-shell type elastomer.

The polymer composition may further include a stiffener containing a glass fiber, and a surface modifier containing siloxane copolyester.

The molded article may include interior materials or exterior materials of an electronic product.

The electronic product may include a smart device, the interior materials may include a rear cover of the smart device, and the exterior materials may include at least one selected from a group including a front cover, a front decoration, a home key, a side key, or a battery cover of the smart device.

The electronic device may include at least one selected from a group including a display apparatus, a computer, a tablet Personal Computer (PC), a printer, a multifunction printer, a refrigerator, a washing machine, an air conditioner, a robot cleaner, a camera, an E-book, an E-paper, 3-dimensional (3D) glasses, and a charger.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
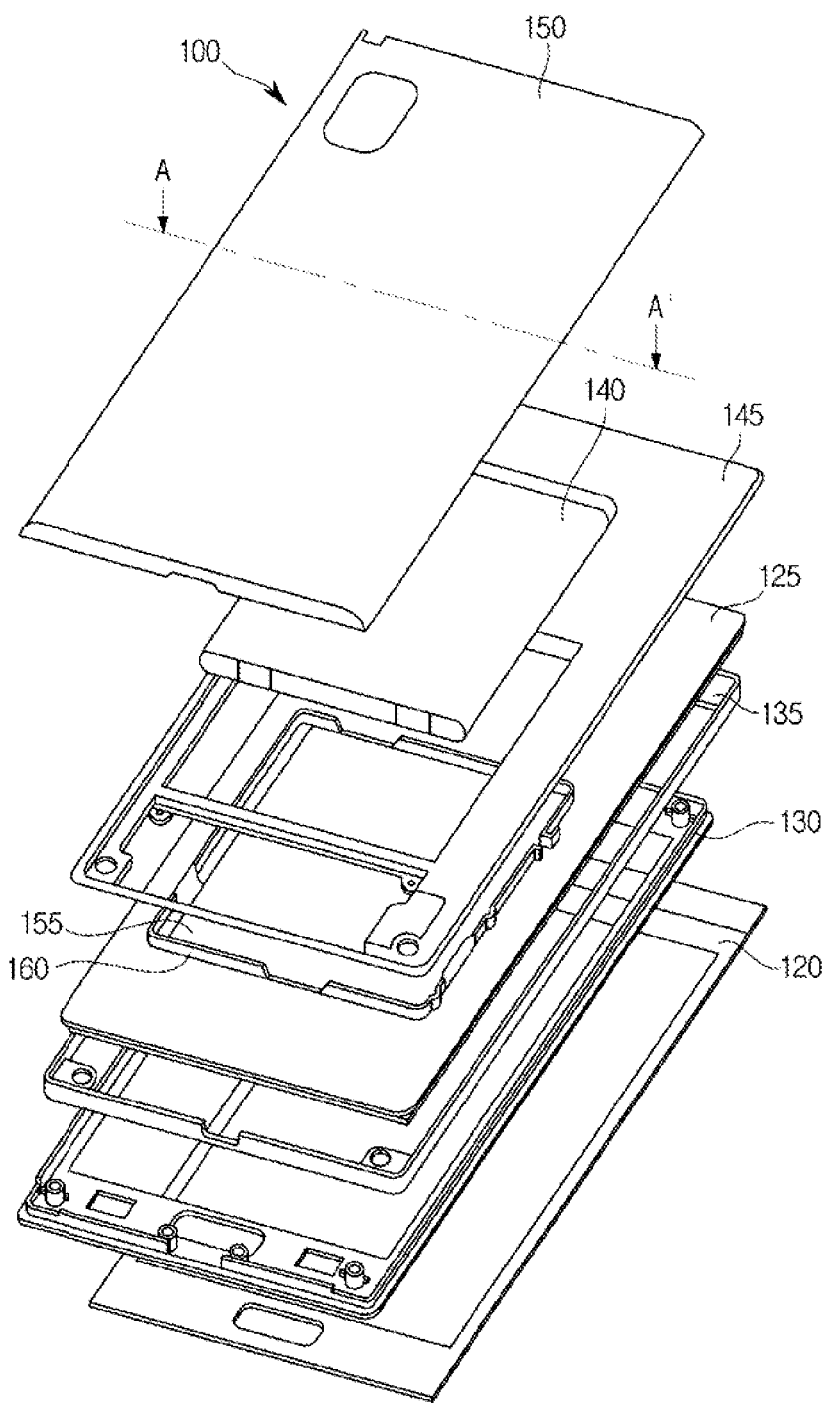
FIG. 1 is an exploded perspective view of a smart device according to an example of a molded article.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

Hereinafter, exemplary embodiments of the present disclosure will be described in detail with reference to the accompanying drawings.

A polymer composition according to an aspect of the present disclosure may include a thermoplastic resin containing polycarbonate, a bio-based resin containing polytrimethylene terephthalate (PTT) extracted from a biomaterial, and an impact modifier containing a core-shell type elastomer. More specifically, the polymer composition may include 70 to 90 parts of weight (wt %) of a thermoplastic resin, 3 to 15 wt % of a bio-based resin containing PTT extracted from a biomaterial, and 3 to 10 wt % of an impact modifier containing the core-shell type elastomer, with respect to the weight of the polymer composition.

The thermoplastic resin may be deformed by heat even after it is heated and molded. According to an embodiment, the thermoplastic resin may be polycarbonate. A polycarbonate resin is a commercial thermoplastic resin, and may be composed of bisphenol A. Since the polycarbonate resin is transparent and has excellent mechanical properties, the polycarbonate resin can provide impact resistance to a molded article formed with the polymer composition according to an embodiment of the present disclosure. Also, the polycarbonate resin may have a self-extinguishing characteristic, and accordingly, the polycarbonate resin may provide heat resistance and fire retardant to a molded article formed with the polymer composition according to an embodiment of the present disclosure. Also, the polycarbonate resin may have excellent flexibility and processability, in addition to impact resistance, heat resistance, and fire retardancy, and accordingly, the polycarbonate resin can be widely applied to various industrial fields including car components, packaging materials, and electronic devices.

The polycarbonate resin's properties can be adjusted by mixing polycarbonate resins with different molecular weights. The thermoplastic resin according to an embodiment of the present disclosure may be at least one material selected from a group including a polycarbonate resin of a low molecular weight, a polycarbonate resin of a high molecular weight, or polysiloxane-polycarbonate resin (Si-PC). More specifically, the thermoplastic resin may include 40 to 60 wt % of a polycarbonate resin of a low molecular weight, 20 to 30 wt % of a polycarbonate resin of a high molecular weight, and 5 to 20 wt % of an Si-PC resin, with respect to the weight of the polymer composition.

Herein, the polycarbonate resin of the low molecular weight may be a resin having a Melt Index (MI) exceeding 10 g/10 min at 300° C. and 1.2 kg, and the polycarbonate resin of the high molecular weight may be a resin having a MI of 10 g/10 min or less at 300° C. and 1.2 kg The Si-PC resin may be a siloxane block. The Si-PC resin may have excellent impact resistance, however, an amount of the Si-PC resin needs to be appropriately adjusted since an excessive amount of the Si-PC resin in the composition may result in low flowability of the composition.

The bio-based resin is a general-purpose polymer resin having biodegradation properties, and is widely used in various industrial fields including medicine, food, disposable products, and coating. The bio-based resin may be included within a range of 3 to 15 wt % with respect to the weight of the polymer composition. The bio-based resin may include PTT extracted from a biomaterial. Herein, the PTT may be made of a biomaterial extracted from a vegetable material such as corn. Hereinafter, in order to distinguish the PTT from synthetic PTT, the PTT made of the biomaterial extracted from the vegetable material will be referred to as bio-polytrimethylene terephthalate (bio-PTT).

The bio-PTT may include radiocarbon C14. Generally, plants perform photosynthesis using carbon dioxide ($CO_2$) obtained from radiocarbon C14 (Carbon 14) in the air. Accordingly, a vegetable material may include radiocarbon C14. Therefore, by measuring an amount of radiocarbon C14 in a material, an amount of a biomaterial can be estimated. The bio-PTT according to the current embodiment may include radiocarbon C14 as a biomaterial extracted from a vegetable material.

The PTT, which is a kind of aromatic polyester, has both of the excellent properties of polyethylene terephthalate (PET) which is an aromatic polyester and the excellent processability of polybutylene terephthalate (PBT). Specifically, the PTT has high chemical resistance and excellent flowability in the polymer composition, like polycarbonate of a low molecular weight. However, the PTT has low heat resistance. The polymer composition according to an embodiment of the present disclosure can improve its fire retardancy by including the polycarbonate resin.

An elastomer, which is a polymer material showing rubber elasticity at room temperature, may be deformed reversibly to several hundreds of percents. Accordingly, an elastomer may act as an agent for modifying the impact strength of the polymer composition according to an embodiment of the present disclosure.

The polymer composition according to an embodiment of the present disclosure may include 3 to 10 wt % of an impact modifier including a core-shell type elastomer. If a too small amount of core-shell type elastomer is included in the polymer composition, the dispersibility of the elastomer in the polymer composition may deteriorate, which may lower the effect of improving impact resistance. In contrast, if a too large amount of the core-shell type elastomer is included in the polymer composition, viscosity increases excessively, which may deteriorate moldability. Accordingly, it is preferable to appropriately adjust an amount of the core-shell type elastomer in the polymer composition.

The core of the core-shell type elastomer may include a silicon and acrylic copolymer, and the shell of the core-shell type elastomer may include polymethylmethacrylate (PMMA). However, the elastomer is not limited to a core-shell type elastomer, and a general impact modifier may be used.

The polymer composition may have fire retardant qualities of V2 grade or more as defined in Underwriter's Laboratory (UL) 94, Standard for Tests for Flammability of Plastic Materials for Parts in Devices and Appliances. The polymer composition according to an embodiment of the present disclosure may ensure a fire-retardant of V2 grade or more by using polycarbonate as a thermoplastic resin.

Also, the polymer composition may have a MI of 10 g/10 min or more at 300° C. and 1.2 kg. The MI is a rate of flow measured when extruding a melt through a piston under predetermined conditions. More specifically, the MI is an index representing flowability of a melt, and the greater the MI, the better moldability for thin film formation. The polymer composition can ensure an excellent melt flow property by using polycarbonate of a low molecular weight.

Also, the polymer composition may have an Izod Notched Impact Strength of 70 kgfcm/cm or more. An Izod Notched test is a test method for measuring impact strength. The polymer composition according to an embodiment of the present disclosure can ensure impact strength with respect to the Izod Notched test by using the core-shell type elastomer.

The polymer composition may further include an additive, wherein the additive may be at least one material selected from a group including thermal stabilizer, UV stabilizer, anti-oxidant, lubricant, or surface stabilizer. The thermal stabilizer, the UV stabilizer, and the anti-oxidant are chemicals that are added to prevent or suppress deterioration of the polymer composition. The polymer composition may include a plastic component such as polycarbonate. However, the plastic component deteriorates due to heat, light, oxygen, etc., and such deterioration needs to be prevented. Accordingly, the polymer composition according to an embodiment of the present disclosure may include thermal stabilizer, UV stabilizer, or anti-oxidant as necessary to prevent deterioration.

The lubricant may be added to improve flowability of the polymer composition when heating and molding the polymer composition so that the polymer composition can be easily processed, or to facilitate pulling out a molded article from a mold (rapping). The polymer composition according to an aspect may include a softener or plasticizer mainly aiming at the improvement of plasticity during processing, as necessary, and also include a release agent for facilitating rapping.

A deodorant may be added to minimize generation of gas when manufacturing an injection-molded article using the polymer composition. The deodorant may be added to ensure reliability when a painting component is deposited on a molded article made from the polymer composition according to an embodiment of the present disclosure.

The surface stabilizer may be added to smoothen the surface of a molded article that is manufactured using the polymer composition. The kind and composition ratio of the polymer composition are not limited to the above-mentioned examples, and thus it is to be understood that various modified examples are possible within a range that can be considered by one of ordinary skill in the art.

Hereinafter, a polymer composition according to another aspect will be described.

A polymer composition according to another aspect may include a thermoplastic resin containing polycarbonate, a bio-based resin extracted from a biomaterial, an impact modifier containing a core-shell type elastomer, a stiffener containing a glass fiber, and a surface modifier containing siloxane copolyester. More specifically, the polymer composition may include 55 to 80 wt % of a thermoplastic resin, 3 to 15 wt % of a bio-based resin, 3 to 10 wt % of a core-shell type elastomer, 10 to 30 wt % of a glass fiber, and 5 to 20 wt % of Si-PC, with respect to the weight of the polymer composition. Detailed descriptions about the thermoplastic resin, the bio-based resin, and the core-shell type elastomer will be omitted, as they are described above.

The polymer composition may further include a glass fiber as a stiffener, and include a surface modifier containing siloxane copolyester in order to improve the dispersibility of the glass fiber with respect to the polymer composition.

The glass fiber is a kind of a synthetic fiber that is produced by stretching glass to fiberize it. The glass fiber according to an embodiment of the present disclosure may include at least one component selected from a group including silicon oxide (SiO2), aluminum oxide (Al2O3), ferric oxide (Fe2O3), calcium oxide (CaO), magnesium oxide (MgO), sodium oxide (Na2O), boric oxide (B2O3), and titanium oxide (TiO2).

The glass fiber may have a length of 3 to 4 mm, and a diameter of 5 to 30 microns, and the section of the glass fiber may have an aspect ratio of 1:1 to 1:4. Hereinafter, a glass fiber having an aspect ratio of 1:1 is defined as a circular glass fiber, and a glass fiber having another aspect ratio is defined as a flat type glass fiber.

The polymer composite may include a circular glass fiber, a flat type glass fiber, or both a circular glass fiber and a flat type glass fiber. Generally, since a flat type glass fiber has excellent dispersibility in a polymer composition, the flat type glass fiber may be used to manufacture a molded article with a smoother surface than a molded article with a high amount of a circular glass fiber. Accordingly, for the purpose of obtaining excellent appearance characteristics, it is preferable to increase an amount of the flat type glass fiber.

The siloxane copolyester may be used to improve the dispersibility of the glass fiber with respect to the polymer composition. The siloxane copolyester may be an ABA block copolymer of a polyester block and a polysiloxane block, but is not limited to this.

The polymer composition further including the glass fiber and the siloxane copolyester has been described above. However, the kind and composition ratio of the polymer composition are not limited to the above-mentioned examples, and thus it is to be understood that various modified examples are possible within a range that can be considered by one of ordinary skill in the art.

Hereinafter, for easy understanding of the present disclosure, the results of a property measurement test with respect to the embodiments of the present disclosure and the comparison examples will be described.

In order to perform a property measurement test, a polymer composition including predetermined amounts of components specified in the embodiments and the comparison examples which will be described below was mixed using a Hensel mixer so as to disperse the components uniformly, and then the polymer composition was extruded under a temperature condition of 240 to 270° C. through a twin screw extruder of L/D=40 and $\phi$=25 mm to fabricate pellets. Thereafter, the pellets were dried at 80° C. for 4 hours, and then injection-molded to fabricate a test piece.

A polymer composition according to Embodiments 1 to 4 and Comparison Examples 1 to 6 may include a thermoplastic resin containing polycarbonate, a bio-based resin containing PTT extracted from a biomaterial, and an impact modifier containing a core-shell type elastomer. Also, a polymer composition according to Embodiments 5 to 8 and Comparison Examples 7 to 12 may further include a glass fiber and siloxane copolyester, in addition to the components of the polymer composition according to the Embodiments 1 to 4 and the Comparison Examples 1 to 6.

Embodiment 1

A test piece was fabricated with a polymer composition including 60 wt % of a polycarbonate resin of a low molecular weight, 27 wt % of a polycarbonate resin of a high molecular weight, 5 wt % of a Si-PC resin, 3 wt % of a bio-PTT resin, 5 wt % of a core-shell type elastomer, 0.3 phr of a UV stabilizer, 0.2 phr of an anti-oxidant, and 0.3 phr of a lubricant, wherein phr is defined as parts with respect to 100 wt % of the entire composition (part per hundred).

Embodiment 2

A test piece was fabricated with a polymer composition including 42 wt % of a polycarbonate resin of a low molecular weight, 30 wt % of a polycarbonate resin of a high molecular weight, 20 wt % of a Si-PC resin, 5 wt % of a bio-PTT resin, 3 wt % of a core-shell type elastomer, 0.3 phr of a UV stabilizer, 0.2 phr of an anti-oxidant, and 0.3 phr of a lubricant.

Embodiment 3

A test piece was fabricated with a polymer composition including 47 wt % of a polycarbonate resin of a low molecular weight, 20 wt % of a polycarbonate resin of a high molecular weight, 15 wt % of a Si-PC resin, 10 wt % of a bio-PTT resin, 8 wt % of a core-shell type elastomer, 0.3 phr of a UV stabilizer, 0.2 phr of an anti-oxidant, and 0.3 phr of a lubricant.

Embodiment 4

A test piece was fabricated with a polymer composition including 40 wt % of a polycarbonate resin of a low molecular weight, 30 wt % of a polycarbonate resin of a high molecular weight, 5 wt % of a Si-PC resin, 15 wt % of a bio-PTT resin, 10 wt % of a core-shell type elastomer, 0.3 phr of a UV stabilizer, 0.2 phr of an anti-oxidant, and 0.3 phr of a lubricant.

Comparison Example 1

A test piece was fabricated with a polymer composition including 55 wt % of a polycarbonate resin of a low molecular weight, 20 wt % of a polycarbonate resin of a high molecular weight, 0 wt % of a Si-PC resin, 20 wt % of a bio-PTT resin, 5 wt % of a core-shell type elastomer, 0.3 phr of a UV stabilizer, 0.2 phr of an anti-oxidant, and 0.3 phr of a lubricant.

Comparison Example 2

A test piece was fabricated with a polymer composition including 30 wt % of a polycarbonate resin of a low molecular weight, 15 wt % of a polycarbonate resin of a high molecular weight, 30 wt % of a Si-PC resin, 20 wt % of a bio-PTT resin, 5 wt % of a core-shell type elastomer, 0.3 phr of a UV stabilizer, 0.2 phr of an anti-oxidant, and 0.3 phr of a lubricant.

Comparison Example 3

A test piece was fabricated with a polymer composition including 44 wt % of a polycarbonate resin of a low molecular weight, 30 wt % of a polycarbonate resin of a high molecular weight, 21 wt % of a Si-PC resin, 0 wt % of a bio-PTT resin, 5 wt % of a core-shell type elastomer, 0.3 phr of a UV stabilizer, 0.2 phr of an anti-oxidant, and 0.3 phr of a lubricant.

Comparison Example 4

A test piece was fabricated with a polymer composition including 30 wt % of a polycarbonate resin of a low molecular weight, 15 wt % of a polycarbonate resin of a high molecular weight, 15 wt % of a Si-PC resin, 35 wt % of a bio-PTT resin, 5 wt % of a core-shell type elastomer, 0.3 phr of a UV stabilizer, 0.2 phr of an anti-oxidant, and 0.3 phr of a lubricant.

Comparison Example 5

A test piece was fabricated with a polymer composition including 40 wt % of a polycarbonate resin of a low molecular weight, 30 wt % of a polycarbonate resin of a high molecular weight, 15 wt % of a Si-PC resin, 15 wt % of a bio-PTT resin, 0 wt % of a core-shell type elastomer, 0.3 phr of a UV stabilizer, 0.2 phr of an anti-oxidant, and 0.3 phr of a lubricant.

Comparison Example 6

A test piece was fabricated with a polymer composition including 38 wt % of a polycarbonate resin of a low molecular weight, 20 wt % of a polycarbonate resin of a high molecular weight, 15 wt % of a Si-PC resin, 16 wt % of a bio-PTT resin, 11 wt % of a core-shell type elastomer, 0.3 phr of a UV stabilizer, 0.2 phr of an anti-oxidant, and 0.3 phr of a lubricant.

Composition ratios of Embodiments 1 to 4 and Comparison Examples 1 to 6 are listed in Table 1, below.

TABLE 1

| | | Embodiment | | | | Comparison Example | | | | | |
|---|---|---|---|---|---|---|---|---|---|---|---|
| | Component | 1 | 2 | 3 | 4 | 1 | 2 | 3 | 4 | 5 | 6 |
| Resin (wt %) | PC Resin of Low Molecular Weight | 60 | 42 | 47 | 40 | 55 | 30 | 44 | 30 | 40 | 38 |
| | PC Resin of High Molecular Weight | 27 | 30 | 20 | 30 | 20 | 15 | 30 | 15 | 30 | 20 |
| | SI-PC Resin | 5 | 20 | 15 | 5 | 0 | 30 | 21 | 15 | 15 | 15 |
| | Bio-PTT Resin | 3 | 5 | 10 | 15 | 20 | 20 | 0 | 35 | 15 | 16 |
| | Core-Shell Type Elastomer (wt %) | 5 | 3 | 8 | 10 | 5 | 5 | 5 | 5 | 0 | 11 |
| | UV Stabilizer (phr) | 0.3 | 0.3 | 0.3 | 0.3 | 0.3 | 0.3 | 0.3 | 0.3 | 0.3 | 0.3 |
| | Anti-Oxidant (phr) | 0.2 | 0.2 | 0.2 | 0.2 | 0.2 | 0.2 | 0.2 | 0.2 | 0.2 | 0.2 |
| | Lubricant (phr) | 0.3 | 0.3 | 0.3 | 0.3 | 0.3 | 0.3 | 0.3 | 0.3 | 0.3 | 0.3 |

Embodiment 5

A test piece was fabricated with a polymer composition including 60 wt % of a polycarbonate resin of a low molecular weight, 10 wt % of a polycarbonate resin of a high molecular weight, 6 wt % of a Si-PC resin, 3 wt % of a bio-PTT resin, 10 wt % of a circular glass fiber whose section has an aspect ratio of 1:1, 1 wt % of a siloxane copolyester, 10 wt % of a core-shell type elastomer, 0.3 phr of a UV stabilizer, 0.2 phr of an anti-oxidant, and 0.3 phr of a lubricant.

Embodiment 6

A test piece was fabricated with a polymer composition including 38 wt % of a polycarbonate resin of a low molecular weight, 10 wt % of a polycarbonate resin of a high molecular weight, 20 wt % of a Si-PC resin, 15 wt % of a bio-PTT resin, 10 wt % of a circular glass fiber whose section has an aspect ratio of 1:1, 2 wt % of a siloxane copolyester, 5 wt % of a core-shell type elastomer, 0.3 phr of a UV stabilizer, 0.2 phr of an anti-oxidant, and 0.3 phr of a lubricant.

Embodiment 7

A test piece was fabricated with a polymer composition including 50 wt % of a polycarbonate resin of a low molecular weight, 20 wt % of a polycarbonate resin of a high molecular weight, 5 wt % of a Si-PC resin, 10 wt % of a bio-PTT resin, 10 wt % of a flat type glass fiber whose section has an aspect ratio of 1:4, 2 wt % of a siloxane copolyester, 3 wt % of a core-shell type elastomer, 0.3 phr of a UV stabilizer, 0.2 phr of an anti-oxidant, and 0.3 phr of a lubricant.

Embodiment 8

A test piece was fabricated with a polymer composition including 40 wt % of a polycarbonate resin of a low molecular weight, 15 wt % of a polycarbonate resin of a high molecular weight, 1 wt % of a Si-PC resin, 4 wt % of a bio-PTT resin, 30 wt % of a flat type glass fiber whose section has an aspect ratio of 1:4, 5 wt % of a siloxane copolyester, 5 wt % of a core-shell type elastomer, 0.3 phr of a UV stabilizer, 0.2 phr of an anti-oxidant, and 0.3 phr of a lubricant.

Comparison Example 7

A test piece was fabricated with a polymer composition including 60 wt % of a polycarbonate resin of a low molecular weight, 15 wt % of a polycarbonate resin of a high molecular weight, 0 wt % of a Si-PC resin, 15 wt % of a bio-PTT resin, 10 wt % of a circular glass fiber whose section has an aspect ratio of 1:1, 0 wt % of a siloxane copolyester, 0 wt % of a core-shell type elastomer, 0.3 phr of a UV stabilizer, 0.2 phr of an anti-oxidant, and 0.3 phr of a lubricant.

Comparison Example 8

A test piece was fabricated with a polymer composition including 37 wt % of a polycarbonate resin of a low molecular weight, 5 wt % of a polycarbonate resin of a high molecular weight, 30 wt % of a Si-PC resin, 15 wt % of a bio-PTT resin, 10 wt % of a circular glass fiber whose section has an aspect ratio of 1:1, 1 wt % of a siloxane copolyester, 2 wt % of a core-shell type elastomer, 0.3 phr of a UV stabilizer, 0.2 phr of an anti-oxidant, and 0.3 phr of a lubricant.

Comparison Example 9

A test piece was fabricated with a polymer composition including 44 wt % of a polycarbonate resin of a low molecular weight, 5 wt % of a polycarbonate resin of a high molecular weight, 15 wt % of a Si-PC resin, 0 wt % of a bio-PTT resin, 30 wt % of a circular glass fiber whose section has an aspect ratio of 1:1, 2 wt % of a siloxane copolyester, 4 wt % of a core-shell type elastomer, 0.3 phr of a UV stabilizer, 0.2 phr of an anti-oxidant, and 0.3 phr of a lubricant.

Comparison Example 10

A test piece was fabricated with a polymer composition including 25 wt % of a polycarbonate resin of a low molecular weight, 10 wt % of a polycarbonate resin of a high molecular weight, 15 wt % of a Si-PC resin, 35 wt % of a bio-PTT resin, 10 wt % of a flat type glass fiber whose section has an aspect ratio of 1:4, 0 wt % of a siloxane copolyester, 5 wt % of a core-shell type elastomer, 0.3 phr of a UV stabilizer, 0.2 phr of an anti-oxidant, and 0.3 phr of a lubricant.

Comparison Example 11

A test piece was fabricated with a polymer composition including 36 wt % of a polycarbonate resin of a low molecular weight, 10 wt % of a polycarbonate resin of a high molecular weight, 15 wt % of a Si-PC resin, 15 wt % of a bio-PTT resin, 20 wt % of a flat type glass fiber whose section has an aspect ratio of 1:4, 4 wt % of a siloxane copolyester, 0 wt % of a core-shell type elastomer, 0.3 phr of a UV stabilizer, 0.2 phr of an anti-oxidant, and 0.3 phr of a lubricant.

Comparison Example 12

A test piece was fabricated with a polymer composition including 24 wt % of a polycarbonate resin of a low molecular weight, 5 wt % of a polycarbonate resin of a high molecular weight, 15 wt % of a Si-PC resin, 20 wt % of a bio-PTT resin, 30 wt % of a flat type glass fiber whose section has an aspect ratio of 1:4, 1 wt % of a siloxane copolyester, 5 wt % of a core-shell type elastomer, 0.3 phr of a UV stabilizer, 0.2 phr of an anti-oxidant, and 0.3 phr of a lubricant.

Composition ratios of Embodiments 5 to 8 and Comparison Examples 7 to 12 are shown in Table 2, below.

TABLE 2

| | Component | Embodiment | | | | Comparison Example | | | | | |
| --- | --- | --- | --- | --- | --- | --- | --- | --- | --- | --- | --- |
| | | 5 | 6 | 7 | 8 | 7 | 8 | 9 | 10 | 11 | 12 |
| Resin (wt %) | PC Resin of Low Molecular Weight | 60 | 38 | 50 | 40 | 60 | 37 | 44 | 25 | 36 | 24 |
| | PC Resin of High Molecular Weight | 10 | 10 | 20 | 15 | 15 | 5 | 5 | 10 | 10 | 5 |
| | SI-PC Resin | 6 | 20 | 5 | 1 | 0 | 30 | 15 | 15 | 15 | 15 |
| | Bio-PTT Resin | 3 | 15 | 10 | 4 | 15 | 15 | 0 | 35 | 15 | 20 |
| | Glass Fiber A (wt %) | 10 | 10 | 0 | 0 | 10 | 10 | 30 | 0 | 0 | 0 |
| | Glass Fiber B (wt %) | 0 | 0 | 10 | 30 | 0 | 0 | 0 | 10 | 20 | 30 |

TABLE 2-continued

|  | Embodiment | | | | Comparison Example | | | | | |
| --- | --- | --- | --- | --- | --- | --- | --- | --- | --- | --- |
| Component | 5 | 6 | 7 | 8 | 7 | 8 | 9 | 10 | 11 | 12 |
| Siloxane Copolyester (wt %) | 1 | 2 | 2 | 5 | 0 | 1 | 2 | 0 | 4 | 0 |
| Core-Shell-Type Elastomer (wt %) | 5 | 3 | 8 | 10 | 5 | 5 | 5 | 5 | 0 | 11 |
| UV Stabilizer (phr) | 0.3 | 0.3 | 0.3 | 0.3 | 0.3 | 0.3 | 0.3 | 0.3 | 0.3 | 0.3 |
| Anti-Oxidant (phr) | 0.2 | 0.2 | 0.2 | 0.2 | 0.2 | 0.2 | 0.2 | 0.2 | 0.2 | 0.2 |
| Lubricant (phr) | 0.3 | 0.3 | 0.3 | 0.3 | 0.3 | 0.3 | 0.3 | 0.3 | 0.3 | 0.3 |

The properties of the test pieces fabricated with the polymer compositions according to Embodiments 1 to 8 and Comparison Examples 1 to 12 were evaluated using the following methods.

Melt Index (MI)

MIs of the test pieces fabricated with the polymer compositions according to Embodiments 1 to 8 and Comparison Examples 1 to 12 were measured at 1.2 kg and 300° C. according to the American Society for Testing and Materials (ASTM) D1238 standard.

Izod Notched Impact Strength

Izod notched impact strengths of the test pieces fabricated with the polymer compositions according to Embodiments 1 to 8 and Comparison Examples 1 to 12 were measured according to the ASTM D256 standard.

Fall Hammer Test

A test of dropping a hammer of 500 g on the test pieces fabricated with the polymer compositions according to Embodiments 1 to 8 and Comparison Examples 1 to 12 at a height of 50 cm was performed.

Cosmetic Resistance

Nivea Aqua Sun Spray™ (SPF30, PA++) was applied on the painting surfaces of the test pieces fabricated with the polymer compositions according to Embodiments 1 to 4 and Comparison Examples 1 to 6, and then the test pieces were kept at 80° C./80%. After 24 hours elapsed, the test pieces were washed, dried, and then kept for 4 hours at room temperature. Then, the test pieces were cross-cut into sizes of 2 mm, and then taken off using a tape.

Appearance Characteristics

Any glass fiber protruding from the surfaces of the test pieces fabricated with the polymer compositions according to Embodiments 5 to 8 and Comparison Examples 7 to 12 was checked with the naked eye.

Fire Retardant

Fire retardancy of test pieces of 1 mm fabricated with the polymer compositions according to Embodiments 1 to 8 and Comparison Examples 1 to 12 was measured according to the UL94.

The properties of the test pieces measured using the above-described method are shown in Table 3 and Table 4, below. More specifically, the properties of the test pieces fabricated with the polymer compositions according to Embodiments 1 to 4 and Comparison Examples 1 to 6 are shown in Table 3, and the properties of the test pieces fabricated with the polymer compositions according to Embodiments 5 to 8 and Comparison Examples 7 to 12 are shown in Table 4.

TABLE 3

|  | Embodiment | | | | Comparison Example | | | | | |
| --- | --- | --- | --- | --- | --- | --- | --- | --- | --- | --- |
| Property | 1 | 2 | 3 | 4 | 1 | 2 | 3 | 4 | 5 | 6 |
| MI (g/10 cm) | 14 | 10 | 12 | 14 | 16 | 6 | 8 | 12 | 12 | 14 |
| Izod Notched Impact Strength (kgfcm/cm) | 75 | 74 | 78 | 82 | 70 | 78 | 80 | 68 | 50 | 83 |
| Fall Hammer Test | Pass | Pass | Pass | Pass | NG | Pass | Pass | Pass | NG | Pass |
| Cosmetic Resistance | Pass | Pass | Pass | Pass | Pass | Pass | NG | Pass | Pass | Pass |
| Fire Retardancy | V-2 | V-2 | V-2 | V-2 | V-2 | V-2 | V-2 | NG | V-2 | NG |

TABLE 4

|  | Embodiment | | | | Comparison Example | | | | | |
| --- | --- | --- | --- | --- | --- | --- | --- | --- | --- | --- |
| Factor | 5 | 6 | 7 | 8 | 7 | 8 | 9 | 10 | 11 | 12 |
| MI (g/10 cm) | 13 | 12 | 15 | 13 | 14 | 15 | 12 | 14 | 10 | 8 |
| Izod Notched Impact Strength (kgfcm/cm) | 28 | 30 | 28 | 18 | 22 | 25 | 14 | 21 | 20 | 18 |
| Fall Hammer Test | Pass | Pass | Pass | Pass | NG | NG | Pass | Pass | NG | Pass |
| External Appearance | Pass | Pass | Pass | Pass | NG | Pass | NG | NG | Pass | NG |
| Fire Retardancy | V-2 | V-2 | V-2 | V-2 | V-2 | V-2 | V-2 | NG | V-2 | NG |

As shown in Table 3 and Table 4, Embodiments 1 to 8 could achieve both excellent fire retardancy and impact resistance. Meanwhile, Comparison Examples 1 to 12 have low impact resistance, low cosmetic resistance, or low external appearance property, but excellent fire retardancy.

More specifically, as shown in Table 1 and Table 3, the polymer composition according to Comparison Example 1 showed high flowability of MI 16 g/10 cm, and showed relatively high impact strength of Izod notched impact strength 70 kgfcm/cm. Meanwhile, the fall hammer test performed on the test piece failed. The polysiloxane polycarbonate resin provides excellent impact resistance to the polymer composition and the test piece fabricated using the polymer composition. However, since the polymer composition according to Comparison example 1 includes no polysiloxane polycarbonate resin, the fall hammer test failed.

In Comparison Example 2, the property of the test piece of the polymer composition using 30 wt % of polysiloxane polycarbonate was measured. As a result, the polymer composition showed relatively high impact strength of Izod notched impact strength 78 kgfcm/cm, and the fall hammer test performed on the polymer composition passed. Meanwhile, the MI of the polymer composition decreased from 16 g/10 cm to 6 g/10 cm. If the polymer composition contains a too large amount of the polysiloxane polycarbonate resin, the flowability of the polymer composition deteriorates. The polymer composition according to Comparison Example 2 containing a too large amount of a polysiloxane polycarbonate resin showed a small MI.

In Comparison Example 3, an amount of the polysiloxane polycarbonate resin was adjusted to 21 wt %, and an amount of the bio-PTT resin was adjusted to 0 wt %. The resultant polymer composition showed a MI of 8 g/10 cm that is greater than that of Comparison Example 2, and also showed relatively high impact strength of Izod notched impact strength 80 kgfcm/cm. Meanwhile, the cosmetic resistance test failed. Since the polymer composition according to Comparison Example 3 includes no bio-PTT resin that provides excellent cosmetic resistance or chemical resistance to the polymer composition and the test piece fabricated using the polymer composition, the cosmetic resistance test failed.

In Comparison Example 4, an amount of the bio-PTT resin was increased to 35 wt %, and the property of the test piece of the resultant polymer composition was measured. According to the test result, the polymer composition passed the cosmetic resistance test, and failed in acquiring a fire-retardant grade of V2. The test results show that the polymer composition containing a too large amount of the bio-PTT resin has low fire retardant quality.

In Comparison Example 5, an amount of the polysiloxane polycarbonate resin was adjusted to 15 wt %, and an amount of the core-shell type elastomer was adjusted to 0 wt %. According to the test result, the resultant polymer composition passed the cosmetic resistance test, and acquired a fire-retardant grade of V2. However, the polymer composition failed in the fall hammer test. Since the polymer composition according to Comparison Example 5 includes no core-shell type elastomer acting as an impact modifier, the fall hammer test failed.

In Comparison Example 6, an amount of the bio-PTT resin was adjusted to 16 wt %, and an amount of the core-shell type elastomer was adjusted to 11 wt %. According to the test result, the resultant polymer composition passed the fall hammer test, and failed in acquiring a fire-retardant grade of V2. The test results show that if an amount of the bio-PTT resin exceeds 15 wt % with respect to 100 wt % of the entire composition or if an amount of the core-shell type elastomer is too high, fire retardancy of the test piece deteriorates.

As shown in Table 2 and Table 4, the polymer composition according to Comparison Example 7 showed high flowability of MI 14 g/10 cm, and relatively high impact strength of Izod notched impact strength 22 kgfcm/cm. Meanwhile, the test piece failed in both the fall hammer test and the external appearance test.

The results of the property test performed on the polymer composition according to Comparison Example 7 show that the polymer composition including neither the core-shell type elastomer nor the siloxane copolyester has low impact resistance and low dispersibility of the glass fiber with respect to the polymer composition so that protrusions of the glass fiber were seen with the naked eye.

The polymer composition according to Comparison Example 8 showed high flowability of MI 15 g/10 cm, and relatively high impact strength of Izod notched impact strength 25 kgfcm/cm, and also, the polymer composition passed the external appearance test and failed in the fall hammer test.

The results of the property test performed on the polymer composition according to Comparison Example 8 show that the polymer composition including the siloxane copolyester improves dispersibility of the glass fiber with respect to the polymer composition so as to satisfy external appearance characteristics of the test piece. Meanwhile, the polymer composition including 2 wt % of the core-shell type elastomer with respect to 100 wt % of the entire composition failed in satisfying impact resistance.

Also, the polymer composition according to Comparison Example 9 showed high flowability of MI 12 g/10 cm, and relatively high impact strength of Izod notched impact strength 14 kgfcm/cm, and also, the polymer composition failed in the external appearance test and passed the fall hammer test.

The results of the property test performed on the polymer composition according to Comparison Example 9 show that the polymer composition including 4 wt % of the core-shell type elastomer with respect to 100 wt % of the entire composition has improved impact strength. Meanwhile, the polymer composition containing no bio-PTT resin or a too large amount of the glass fiber failed in satisfying external appearance characteristics.

Also, the polymer composition according to Comparison Example 10 showed high flowability of MI 14 g/10 cm, and relatively high impact strength of Izod notched impact strength 21 kgfcm/cm, and also, the polymer composition passed the fall hammer test, failed in the external appearance test, and also failed in satisfying fire retardancy.

The results of the property test performed on the polymer composition according to Comparison Example 10 show that the polymer composition including no siloxane copolyester has low dispersibility of the glass fiber with respect to the polymer composition so that protrusions of the glass fiber were seen with the naked eye. Meanwhile, it was verified that the polymer composition containing a too large amount of the bio-PTT resin has low fire retardant quality.

Also, the polymer composition according to Comparison Example 11 showed high flowability of MI 10 g/10 cm, and relatively high impact strength of Izod notched impact strength 20 kgfcm/cm, and also, the polymer composition passed the external appearance test, but failed in the fall hammer test.

The results of the property test performed on the polymer composition according to Comparison Example 11 show that the polymer composition including no core-shell type elastomer has low impact strength.

Also, the polymer composition according to Comparison Example 12 showed high flowability of MI 8 g/10 cm, and relatively high impact strength of Izod notched impact strength 18 kgfcm/cm, and also, the polymer composition passed the fall hammer test, failed in the external appearance test, and also failed in satisfying fire retardancy.

The results of the property test performed on the polymer composition according to Comparison Example 12 show that the polymer composition including a too large amount of the bio-PTT resin and a too large amount of the glass fiber has low fire retardant quality and fails in satisfying the external appearance characteristics.

The results of the property tests performed on the Embodiments and the Comparison Examples of the polymer compositions having a good fire retardant quality and environment-friendliness have been described above.

Hereinafter, a molded article made of the polymer composition according to an embodiment of the present disclosure will be described.

A molded article according to an embodiment of the present disclosure may be made of a polymer composition including a thermoplastic resin containing polycarbonate, a bio-based resin containing PTT extracted from a biomaterial, and an impact modifier containing core-shell type elastomer.

The molded article may be molded in the form of a film, a sheet, a pellet, or a fiber, and may include interior materials or exterior materials of an electronic product.

The electronic product may be at least one device selected from a group including a smart device, a display apparatus, a computer, a monitor, a tablet Personal Computer (PC), a printer, a multifunction printer, a refrigerator, a washing machine, an air conditioner, a robot cleaner, a camera, an E-book, an E-paper, 3-dimensional (3D) glasses, or a charger.

A molded article for a component requiring excellent impact resistance may be made of a polymer composition including a thermoplastic resin containing polycarbonate, a bio-based resin containing PTT extracted from a biomaterial, an impact modifier containing core-shell type elastomer, and a stiffener containing a glass fiber.

For example, in the case of a component requiring high stiffness, like a battery cover of a smart device or a main body of a display apparatus, a glass fiber may be added to reinforce stiffness. However, the glass fiber may protrude from the surface of a molded article during molding of a polymer composition, and thus, an appearance failure may occur after a later process, such as painting or deposition, is performed. In order to prevent such appearance failure, a flat type glass fiber, instead of a circular glass fiber, may be used. According to another embodiment, a surface modifier containing siloxane copolyester may be further added to the polymer composition.

Hereinafter, a smart device will be described as an example of a molded article.

Figure 2:
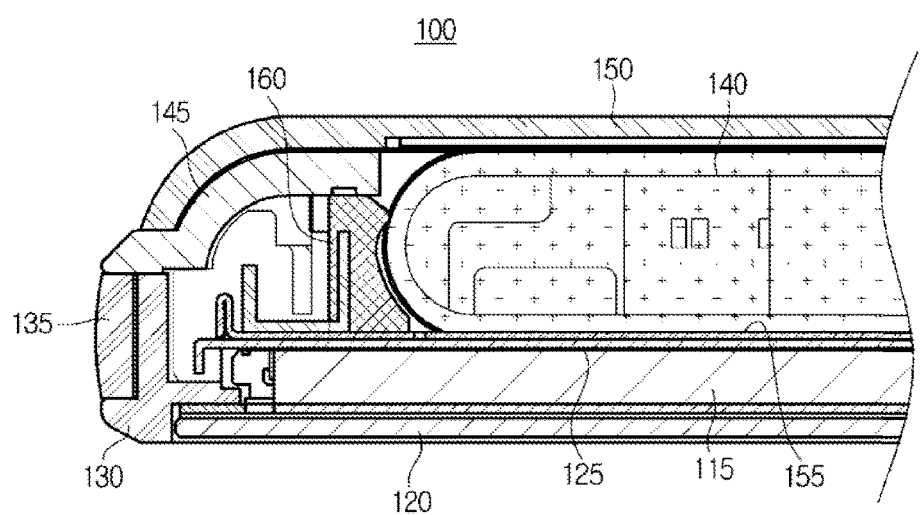
FIG. 2 is a cross-sectional view of the smart device of FIG. 1 cut along a line A-A'.

FIG. 1 is an exploded perspective view of a smart device which is an example of a molded article, and FIG. 2 is a cross-sectional view of the smart device of FIG. 1 cut along a line A-A'.

Referring to FIGS. 1 and 2, a smart device 100 may include a display module 115, a window glass 120 disposed on the front surface of the display module 115, a frame 125 disposed on the back surface of the display module 115, a front cover 130 surrounding the edges of the display module 115 and the window glass 120, a front decoration 135 disposed along the outer circumference of the front cover 130, a battery 140 rested on the rear surface of the frame 125, a rear cover 145 disposed on the rear surface of the frame 125, and a battery cover 150 to cover the rear cover 145 and the battery 140.

More specifically, a battery hole into which the battery 140 is inserted may be formed in an inner section of the rear cover 145. Accordingly, the battery 140 may be rested on the rear surface of the frame 125 through the battery hole. Also, the frame 125 may include a battery resting part 155, and a guide rib 160 may be formed along the edges of the battery resting part 155. The guide rib 160 may define a battery installation section, and the guide rib 160 may surround the battery hole of the rear cover 145. Also, in the upper part of the rear cover 145, various application components may be packaged, and the battery 140 may be positioned in the lower part of the rear cover 145.

The molded article may include the frame 125, the front cover 130, the front decoration 135, the rear cover 145, and the battery cover 150 of the smart device 100, as shown in FIGS. 1 and 2. However, application examples for the smart device 100 are not limited to the above-mentioned devices. That is, the molded article according to an embodiment may include a home key of a smart device, a button part of a smart device, or another device which can be considered by one of ordinary skill in the art.

Hereinafter, a display apparatus 200 will be described as another example of the molded article.

Figure 3:
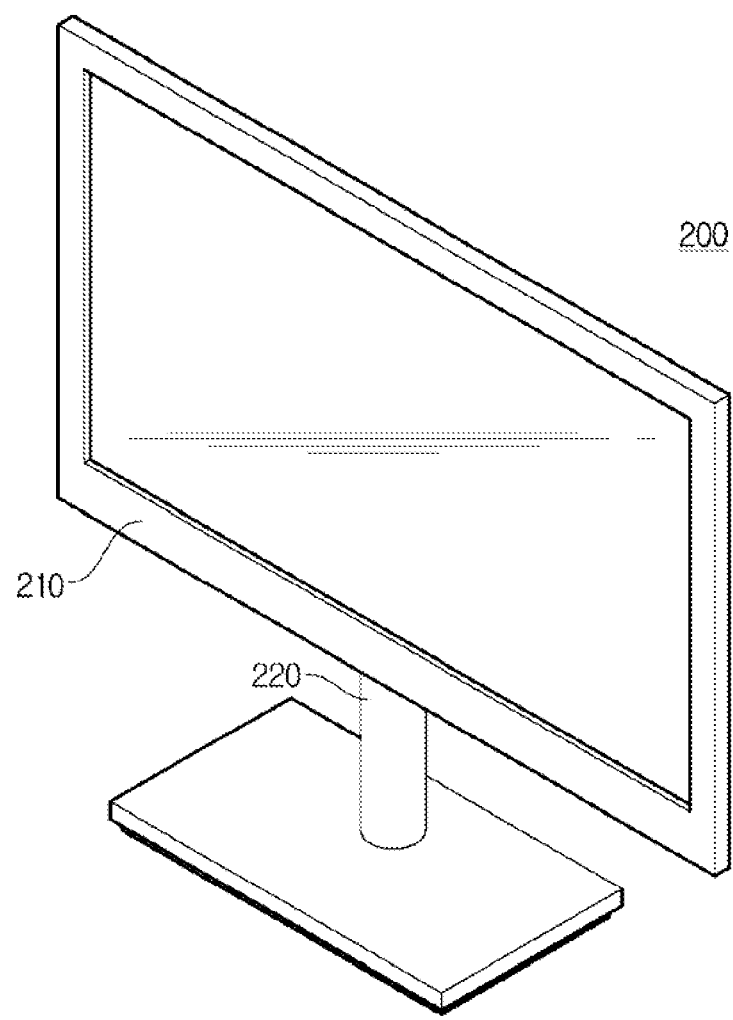
FIG. 3 is a perspective view of a display apparatus which is an example of a molded article.

FIG. 3 is a perspective view of a display apparatus according to an embodiment of the present disclosure.

Referring to FIG. 3, a display apparatus 200 may include a main body 210 configured to display images and to output sound, and a stand 220 configured to support the main body 210.

The main body 210 and the stand 220 of the display apparatus 200 may include the polymer composition described above. That is, the main body 210 and the stand 220 may be molded articles manufactured by injection-molding the polymer composition. However, application examples for the display apparatus 200 are not limited to the main body 210 and the stand 220. That is, the molded article according to an embodiment of the present disclosure may include interior materials of the display apparatus 200 and another device that can be considered by one of ordinary skill in the art.

Examples of the molded article including the polymer composition according to an embodiment of the present disclosure have been described above.

Hereinafter, a method of manufacturing a molded article according to an embodiment of the present disclosure will be described.

First, a structure of an extruder for producing the polymer composition according to an embodiment of the present disclosure, and a structure of an injection-molding machine for manufacturing a molded article with the polymer composition produced by the extruder will be described.

Figure 4:
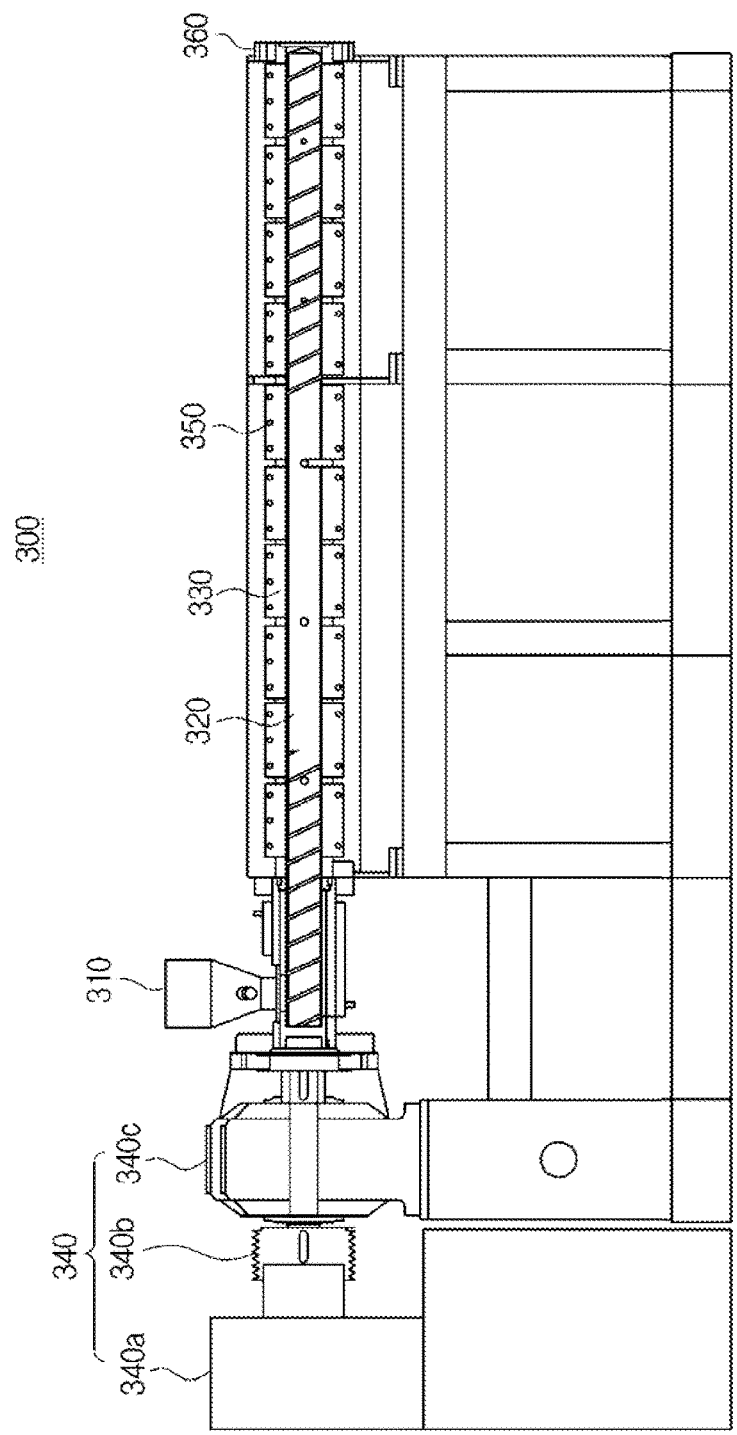
FIG. 4 shows a structure of an extruder according to an embodiment of the present disclosure.
Figure 5:
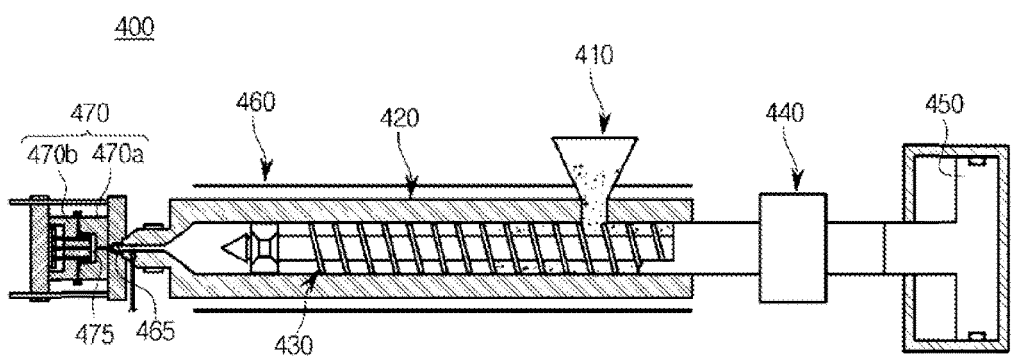
FIG. 5 shows a structure of an injection-molding machine according to an embodiment of the present disclosure.

FIG. 4 shows a structure of an extruder according to an embodiment of the present disclosure, and FIG. 5 shows a structure of an injection-molding machine according to an embodiment of the present disclosure.

Referring to FIG. 4, an extruder 300 according to an embodiment of the present disclosure may include an extruder hopper 310 configured to receive a raw material, a shaft 320 disposed rotatably, an extruder cylinder 330 surrounding the shaft 320, an extruder driver 340 configured to rotate the shaft 320, an extruder heater 350 configured to heat the inside of the extruder cylinder 330, an extrusion die 360 configured to discharge a polymer composition, and an extruder controller (not shown) configured to control heating temperature of the extruder heater 350. The extruder 300 may be a continuous flow single screw extruder, as shown in FIG. 4. However, the extruder 300 is not limited to the continuous flow single screw extruder. For example, the extruder 300 may be a continuous flow twin screw extruder.

The extruder driver 340 may include a motor 340a configured to rotate the shaft 320, a coupling member 340b connected to the motor 340a and configured to transfer a driving force of the motor 340a to a gear member 340c, and the gear member 340c configured to receive the driving force of the motor 340a and to rotate the shaft 320. The shaft 320 that is driven by the extruder driver 340 may rotate in a predetermined direction (for example, a clockwise direction) in order to apply shear stress to a melt mixture. The shaft 320 may rotate at speed of 100 to 400 rpm.

The extruder heater 350 may be composed of a plurality of units arranged from a supply area to a discharge area to adjust the inside temperature of the extruder cylinder 330. That is, the inside of the extruder cylinder 330 may be divided into a plurality of sections such that temperature can be adjusted for each section, wherein the individual sections can be set to appropriate temperature levels according to a raw material that is processed.

Referring to FIG. 5, an injection-molding machine 400 according to an embodiment of the present disclosure may include an injection-molding machine hopper 410 configured to receive a raw material (for example, a synthetic resin), a barrel 420 configured to accommodate the raw material received through the injection-molding machine hopper 410, a screw 430 rotatably installed in the barrel 420 and configured to move back and forth in the barrel 420, an injection-molding machine motor 440 configured to transfer a rotation force to the screw 430, an injection-molding machine cylinder unit 450 connected to the screw 430 and configured to linearly move the screw 430, an injection-molding machine heater 460 disposed on the circumference surface of the barrel 420 and configured to heat the raw material accommodated in the barrel 420, a nozzle 465 configured to supply the raw material accommodated in the barrel 420 to a mold unit 470, and the mold unit 470 configured to receive the raw material from the nozzle 465 and to mold a molded article.

The mold unit 470 may include a first mold 470a to receive the raw material, and a second mold 470b combined with the first mold 470a to form injection cavity 475. The first mold 470a may be a fixed mold, and the second mold 470b may be a movable mold.

The extruder 300 and the injection-molding machine 400 for manufacturing the molded article according to an embodiment of the present disclosure have been described above. Hereinafter, a method of manufacturing the molded article according to an embodiment of the present disclosure will be described.

A method of manufacturing the molded article according to an embodiment of the present disclosure may include: operation of extruding a composition (hereinafter, referred to as a raw material) including a thermoplastic resin containing polycarbonate, a bio-based resin, and an impact modifier containing core-shell type elastomer to produce a polymer composition; and operation of injection-molding the polymer composition.

Operation of extruding the raw material may include operation of freely mixing the raw material using the Hensel mixer, operation of putting the mixed raw material into the extruder hopper 310 (see FIG. 4), operation of melting the raw material, and operation of applying shear stress to the melt raw material to disperse the raw material. Also, operation of extruding the raw material may further include operation of drying the raw material discharged from the extrusion die 360 (see FIG. 4). Also, operation of drying the raw material discharged from the extrusion die 360 may include operation of drying the extruded raw material to produce pellets.

Operation of injection-molding the polymer composition may include operation of putting the extruded polymer composition into the injection-molding machine hopper 410, operation of melting the polymer composition, and operation of supplying the melt polymer composition to the molding unit 470. Operation of putting the extruded polymer composition into the injection-molding machine hopper 410 may be operation of putting the pellets into the injection-molding machine hopper 410.

Hereinafter, for easy understanding, a method of manufacturing molded articles that are the battery cover 150 and the rear cover 145 of the smart device 100 (see FIG. 2) will be described.

Manufacturing Example 1

In order to manufacture the rear cover 145 of the smart device 100, first, a polycarbonate resin of a high molecular weight, a polycarbonate resin of a low molecular weight, bio-PTT, a core-shell type elastomer, a UV stabilizer, an anti-oxidant, and another additive(s) may be freely mixed using the Hensel mixer (not shown). More specifically, the polymer composition (also, referred to as a raw material) according to Embodiment 1 to Embodiment 4 and Comparison Example 1 to Comparison Example 6 may be freely mixed using the Hensel mixer. Thereafter, the raw material may be put into the extruder hopper 310 shown in FIG. 4. Then, the raw material may be extruded in the extruder cylinder 330 and then discharged from the extrusion die 360. Thereafter, the raw material may be dried at temperature between 80° C. and 100° C. for 3 to 4 hours.

More specifically, conditions for producing the polymer composition which is a raw material of the rear cover 145 are shown in Table 5, below.

TABLE 5

| Section | Temperature (° C.) | Notes |
|---|---|---|
| First Section | 245 | Extruder Hopper 310 |
| Second Section | 250 | |
| Third Section | 255 | |
| Fourth Section | 260 | |
| Fifth Section | 265 | |
| Sixth Sections | 270 | |
| Seventh Section | 275 | Extrusion Die 360 |

As shown in Table 5, in Manufacturing Example 1, the extruder cylinder 330 may be divided into a plurality of sections to adjust temperature for each section. More specifically, the extruder cylinder 330 may be divided into 7 sections to gradually adjust temperature levels of the individual sections. Hereinafter, the section of the extruder cylinder 330 adjacent to the extruder hopper 310 is defined as a first section, and the section of the extruder cylinder 330 adjacent to the extrusion die 360 is defined as a seventh section. In Manufacturing Example 1, the temperature of the first section may be set to 245° C., and the temperature of the seventh section may be set to 275° C. Also, the inside temperature of the extruder cylinder 330 may be set to gradually rise in a direction from the first section to the seventh section.

The polymer composition may be put into the first section through the extruder hopper 310, and discharged from the seventh section through the extrusion die 360. According to an embodiment, the polymer composition discharged from the seventh section through the extrusion die 360 may be dried to produce pellets.

Thereafter, the pellets may be put into the injection-molding machine hopper 410 and melted. The melt polymer composition may be injection-molded through a mold for the rear cover 145 of the smart device 100 to thereby manufacture the rear cover 145.

Injection conditions for injection-molding of the rear cover 145 of the smart device 100 are shown in Table 6, below.

TABLE 6

| Section | Temperature (° C.) | Notes |
| --- | --- | --- |
| First Section | 280 | Hopper 410 |
| Second Section | 285 | |
| Third Section | 290 | |
| Fourth Section | 295 | Nozzle 465 |
| First Mold | 90 | Fixed Mold |
| Second Mold | 80 | Movable Mold |

As shown in Table 6, in Manufacturing Example 1, the barrel 420 may be divided into a plurality of sections to gradually adjust temperature levels of the individual sections. More specifically, the inside temperature of the barrel 420 adjacent to the nozzle 465 may be set to 295° C., the inside temperature of the barrel 420 adjacent to the injection-molding machine hopper 410 may be set to 280° C., and then a raw material may be supplied to the mold unit 470. Also, the temperature of the first mold 470a which is a fixed mold may be set to 90° C., and the temperature of the second mold 470b which is a movable mold may be set to 80° C.

Manufacturing Example 2

In order to manufacture the battery cover 150 of the smart device 100, a polycarbonate resin of a high molecular weight, a polycarbonate resin of a low molecular weight, PTT, a core-shell type elastomer, a UV stabilizer, an antioxidant, and another additive(s) may be freely mixed using the Hensel mixer (not shown). More specifically, the polymer composition (also, referred to as a raw material) according to Embodiment 5 to Embodiment 8 and Comparison Example 7 to Comparison Example 12 may be freely mixed using the Hensel mixer. Thereafter, the raw material may be put into the extruder hopper 310 shown in FIG. 4. Successively, siloxane copolyester may be put through a first side feeder, a glass fiber may be put through a second side feeder, and then the siloxane copolyester and the glass fiber may be mixed with the raw material. Thereafter, the raw material may be extruded in the extruder cylinder 330 and then discharged from the extrusion die 360. The raw material discharged from the extrusion die 360 may be dried at temperature between 90° C. and 100° C. for 3 to 4 hours, thereby manufacturing the battery cover 150 of the smart device 100.

Figure 6:
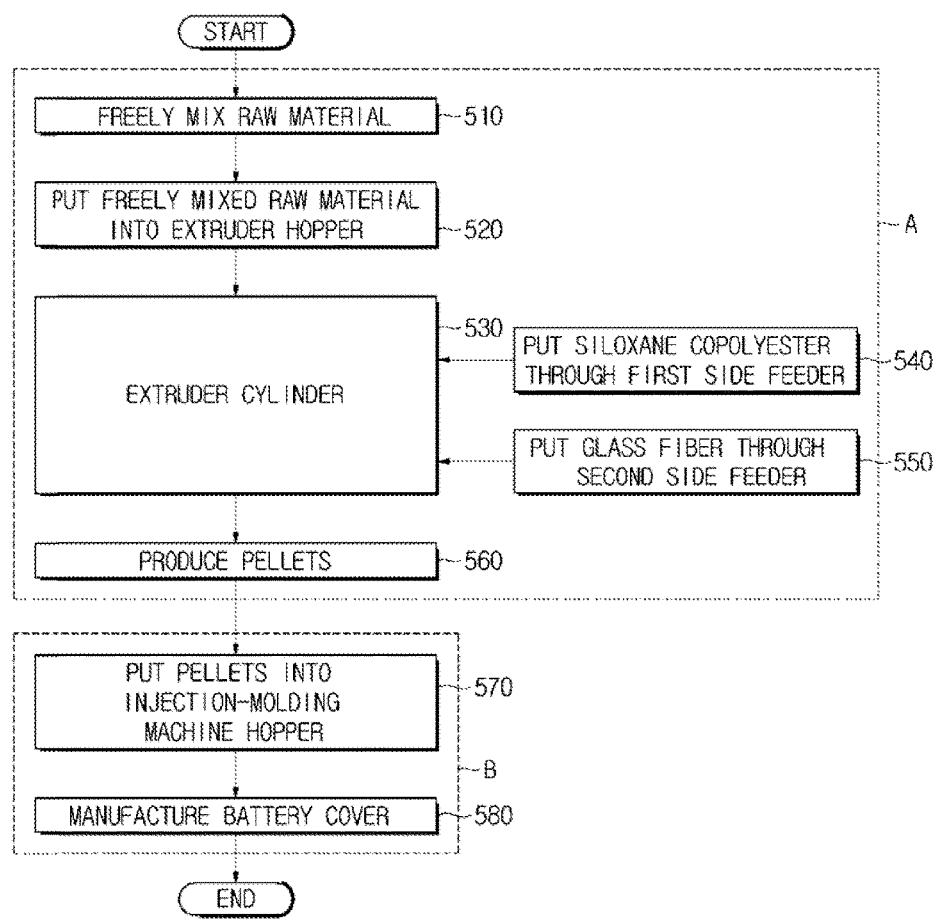
FIG. 6 is a flowchart illustrating a manufacturing method according to Manufacturing Example 2.

Hereinafter, a manufacturing method according to Manufacturing Example 2 will be described in detail with reference to FIG. 6. FIG. 6 is a flowchart illustrating a manufacturing method according to Manufacturing Example 2. A block A of FIG. 6 illustrates a pellet producing process that is performed by the extruder 300 (see FIG. 4), and a block B of FIG. 6 illustrates a battery cover manufacturing process that is performed by the injection-molding machine 400 (see FIG. 5).

Referring to FIGS. 4, 5, and 6, first, the Hensel mixer may be used to freely mix a raw material, in operation 510, and the freely mixed raw material may be put into the extruder hopper 310, in operation 520. The raw material put into the extruder hopper 310 may be extruded in the extruder cylinder 330, in operation 530. At this time, siloxane copolyester may be additionally put into the extruder cylinder 330 through a first side feeder, in operation 540, and a glass fiber may be additionally put into the extruder cylinder 330 through a second side feeder, in operation 550. By putting the siloxane copolyester and the glass fiber through the first side feeder and the second side feeder, respectively, it is possible to appropriately adjust amounts of the siloxane copolyester and the glass fiber, and to prevent the glass fiber from being broken due to a force applied in the extruder 300.

More specifically, conditions for producing the polymer composition which is a raw material of the battery cover 150 according to an embodiment are shown in Table 7, below.

TABLE 7

| Section | Temperature (° C.) | Notes |
| --- | --- | --- |
| First Section | 245 | Extruder Hopper 310 |
| Second Section | 250 | |
| Third Section | 255 | First Side Feeder |
| Fourth Section | 260 | |
| Fifth Section | 265 | |
| Sixth Section | 270 | Second Side Feeder |
| Seventh Section | 275 | Extrusion Die 360 |

As shown in Table 7, in the method of manufacturing the molded article according to Manufacturing Example 2, like the method of manufacturing the molded article according to Manufacturing Example 1, the extruder cylinder 330 may be divided into 7 sections to gradually adjust temperature levels of the individual sections. Hereinafter, the same description as described above with reference to Table 5 will be omitted. In the manufacturing method according to Manufacturing Example 2, the siloxane copolyester may be injected through the first side feeder communicating with the third section, and the glass fiber may be injected through the second side feeder communicating with the sixth section.

The raw material may be put into the first section through the extruder hopper 310, and discharged from the seventh section through the extrusion die 360. In Manufacturing Example 2, the polymer composition discharged from the seventh section through the extrusion die 360 may be dried to produce pellets, in operation 560.

Thereafter, the pellets may be put into the injection-molding machine hopper 410 and melt, in operation 570. The melt polymer composition may be injection-molded through a mold for the battery cover 150 of the smart device 100, thereby manufacturing the battery cover 150, in operation 580.

Injection conditions for injection-molding of the battery cover 150 of the smart device 100 are shown in Table 8, below.

TABLE 8

| Section | Temperature (° C.) | Notes |
|---|---|---|
| First Section | 300 | Hopper 410 |
| Second Section | 305 | |
| Third Section | 310 | |
| Fourth Section | 315 | Nozzle 465 |
| First Mold | 110 | Fixed Mold |
| Second Mold | 90 | Movable Mold |

As shown in Table 8, in Manufacturing Example 2, the inside temperature of the barrel 420 adjacent to the nozzle 465 may be set to 315° C., the inside temperature of the barrel 420 adjacent to the injection-molding machine hopper 410 may be set to 300° C., and then the polymer composition may be supplied to the mold unit 470. Also, the temperature of the first mold 470a which is a fixed mold may be set to 110° C., and the temperature of the second mold 470b which is a movable mold may be set to 90° C.

The mold unit 470 and the barrel 420 may be set to predetermined temperature levels depending on the kind of a molded article. As shown in Table 6 and Table 8, in the case of manufacturing the battery cover 150 of the smart device 100, the mold unit 470 may be set to higher temperature than in the case of manufacturing the rear cover 145 of the smart device 100. The reason is because the thickness of the batter cover 150 of the smart device 100 is thinner than that of the rear cover 145 of the smart device 100, and the mold unit 470 for the battery cover 150 needs to be set to higher temperature in order to lower viscosity of the raw material.

Also, since the molded article manufactured by the manufacturing method according to Manufacturing Example 2 includes the glass fiber, the molded article manufactured by the manufacturing method according to Manufacturing Example 2 can ensure higher stiffness than the molded article manufactured by the manufacturing method according to Manufacturing Example 1.

The polymer composition, the molded article, and the method of manufacturing the molded article, according to the embodiments of the present disclosure, have been described above. However, the method of manufacturing the molded article is not limited to the above-described embodiment, and thus it is to be understood that various modified examples are possible within a range that can be considered by one of ordinary skill in the art.

According to the polymer composition, the molded article, and the method of manufacturing the molded article, as described above, the following effects can be obtained.

First, the bio-PTT extracted from the biomaterial is an eco-friendly material that meets global eco-friendly policies.

Also, thin-film injection-molding is allowed to meet a consumer's needs for slim-shaped products.

Also, the core-shell type elastomer can ensure excellent impact strength.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A polymer composition comprising:
    40 to 60 wt % with respect to the weight of the polymer composition, of polycarbonate resin having a Melt Index exceeding 10 g/10 min at 300° C. and 1.2 kg;
    20 to 30 wt % with respect to the weight of the polymer composition, of polycarbonate having a Melt Index of 10 q/10 min or less at 300° C. and 1.2 kg;
    5 to 20 wt % of a polysiloxane-polycarbonate resin with respect to the weight of the polymer composition;
    3 to 15 parts of weight (wt %) of a bio-based resin with respect to the weight of the polymer composition, the bio-based resin containing polytrimethylene terephthalate produced from a biomaterial; and
    an impact modifier containing a core-shell type elastomer.

2. The polymer composition according to claim 1, wherein the biomaterial is extracted from a plant.

3. The polymer composition according to claim 1, wherein the polytrimethylene terephthalate includes radiocarbon C14.

4. The polymer composition according to claim 1, comprising:
    3 to 10 wt % of the impact modifier with respect to the weight of the polymer composition.

5. The polymer composition according to claim 1, wherein the polysiloxane-polycarbonate resin includes a siloxane block.

6. The polymer composition according to claim 1, wherein the core of the core-shell type elastomer includes a silicon and acrylic copolymer, and a shell of the core-shell type elastomer includes polymethylmethacrylate.

7. The polymer composition according to claim 1, having V2 grade or more defined in the Underwriter's Laboratory 94, Standard for Tests for Flammability of Plastic Materials for Parts in Devices and Appliances, Edition Number 6.

8. The polymer composition according to claim 1, having a Melt Index of 10 g/10 min or more at 300° C. and 1.2 kg.

9. The polymer composition according to claim 1, having an Izod Notched Impact Strength of 70 kgfcm/cm or more.

10. A method of manufacturing a molded article, comprising:
    mixing the polymer composition according to claim 1;
    extracting the polymer composition and
    injection-molding the polymer composition to form the article.

11. The method according to claim 10, further comprising extruding the polymer composition.

12. The method according to claim 11, wherein the extruding of the polymer composition comprises:
    melting the polymer composition; and
    applying shear stress to the polymer composition to disperse the polymer composition.

13. The method according to claim 10, wherein the method further comprises:
    supplying a surface modifier containing siloxane copolyester to the polymer composition; and
    separately supplying a stiffener containing a glass fiber to the polymer composition.

14. The method according to claim 13, wherein the surface modifier is supplied via a front feeder, and the stiffener is supplied via a second feeder.

15. The polymer composition according to claim 1, wherein the polymer composition comprises:
    40 to 47 wt % with respect to the weight of the polymer composition, of polycarbonate resin having a Melt Index exceeding 10 g/10 min at 300° C. and 1.2 kg;
    20 to 27 wt % with respect to the weight of the polymer composition, of polycarbonate having a Melt Index of 10 g/10 min or less at 300° C. and 1.2 kg; and
    5 to 20 wt % of a polysiloxane-polycarbonate resin with respect to the weight of the polymer composition.

16. The polymer composition according to claim 1, wherein the polymer composition comprises:
- 42 to 60 wt % with respect to the weight of the polymer composition, of polycarbonate resin having a Melt Index exceeding 10 g/10 min at 300° C. and 1.2 kg;
- 27 to 30 wt % with respect to the weight of the polymer composition, of polycarbonate having a Melt Index of 10 g/10 min or less at 300° C. and 1.2 kg; and
- 5 to 20 wt % of a polysiloxane-polycarbonate resin with respect to the weight of the polymer composition.

17. The polymer composition according to claim 1, wherein the polymer composition comprises:
- 42 to 47 wt % with respect to the weight of the polymer composition, of polycarbonate resin having a Melt Index exceeding 10 g/10 min at 300° C. and 1.2 kg;
- 20 to 30 wt % with respect to the weight of the polymer composition, of polycarbonate having a Melt Index of 10 g/10 min or less at 300° C. and 1.2 kg; and
- 15 to 20 wt % of a polysiloxane-polycarbonate resin with respect to the weight of the polymer composition.

18. A molded article manufactured with a polymer composition, the polymer composition comprising:
- 40 to 60 wt % with respect to the weight of the polymer composition, of polycarbonate resin having a Melt Index exceeding 10 g/10 min at 300° C. and 1.2 kg,
- 20 to 30 wt % with respect to the weight of the polymer composition, of polycarbonate having a Melt Index of 10 g/10 min or less at 300° C. and 1.2 kg,
- 5 to 20 wt % of a polysiloxane-polycarbonate resin with respect to the weight of the polymer composition,
- 3 to 15 parts of weight (wt %) of a bio-based resin with respect to the weight of the polymer composition, the bio-based resin containing polytrimethylene terephthalate produced with a biomaterial, and
- an impact modifier containing a core-shell type elastomer.

19. The molded article according to claim 18, wherein the polymer composition further comprises a stiffener containing a glass fiber, and
a surface modifier containing siloxane copolyester.

20. The molded article according to claim 18, including materials of an electronic product.

21. The molded article according to claim 20, wherein the electronic product includes a smart device, and
the materials include a rear cover, a front cover, a front decoration, a home key, a side key, or a battery cover of the smart device.

22. The molded article according to claim 20, wherein the electronic device includes a display apparatus, a computer, a tablet Personal Computer, a printer, a multifunction printer, a refrigerator, a washing machine, an air conditioner, a robot cleaner, a camera, an E-book, an E-paper, 3-dimensional glasses, or a charger.

23. The molded article according to claim 18, wherein the polymer composition comprises:
- 40 to 47 wt % with respect to the weight of the polymer composition, of polycarbonate resin having a Melt Index exceeding 10 g/10 min at 300° C. and 1.2 kg;
- 20 to 27 wt % with respect to the weight of the polymer composition, of polycarbonate having a Melt Index of 10 g/10 min or less at 300° C. and 1.2 kg; and
- 5 to 20 wt % of a polysiloxane-polycarbonate resin with respect to the weight of the polymer composition.

24. The molded article according to claim 18, wherein the polymer composition comprises:
- 42 to 60 wt % with respect to the weight of the polymer composition, of polycarbonate resin having a Melt Index exceeding 10 g/10 min at 300° C. and 1.2 kg;
- 27 to 30 wt % with respect to the weight of the polymer composition, of polycarbonate having a Melt Index of 10 g/10 min or less at 300° C. and 1.2 kg; and
- 5 to 20 wt % of a polysiloxane-polycarbonate resin with respect to the weight of the polymer composition.

25. The molded article according to claim 18, wherein the polymer composition comprises:
- 42 to 47 wt % with respect to the weight of the polymer composition, of polycarbonate resin having a Melt Index exceeding 10 g/10 min at 300° C. and 1.2 kg;
- 20 to 30 wt % with respect to the weight of the polymer composition, of polycarbonate having a Melt Index of 10 g/10 min or less at 300° C. and 1.2 kg; and
- 15 to 20 wt % of a polysiloxane-polycarbonate resin with respect to the weight of the polymer composition.

* * * * *

UNITED STATES PATENT AND TRADEMARK OFFICE
CERTIFICATE OF CORRECTION

PATENT NO.       : 10,240,036 B2
APPLICATION NO.  : 14/883739
DATED            : March 26, 2019
INVENTOR(S)      : Song Won Hyun et al.

Page 1 of 1

It is certified that error appears in the above-identified patent and that said Letters Patent is hereby corrected as shown below:

In the Claims

Column 24, Line 3:
Claim 1, delete "10 q/10" insert -- 10 g/10 --, therefor.

Signed and Sealed this
Thirteenth Day of August, 2019

Andrei Iancu
*Director of the United States Patent and Trademark Office*